No. 688,121. Patented Dec. 3, 1901.
H. C. REW.
APPARATUS FOR THE MANUFACTURE OF GAS.
(Application filed Mar. 20, 1901.)
(No Model.) 2 Sheets—Sheet 1.
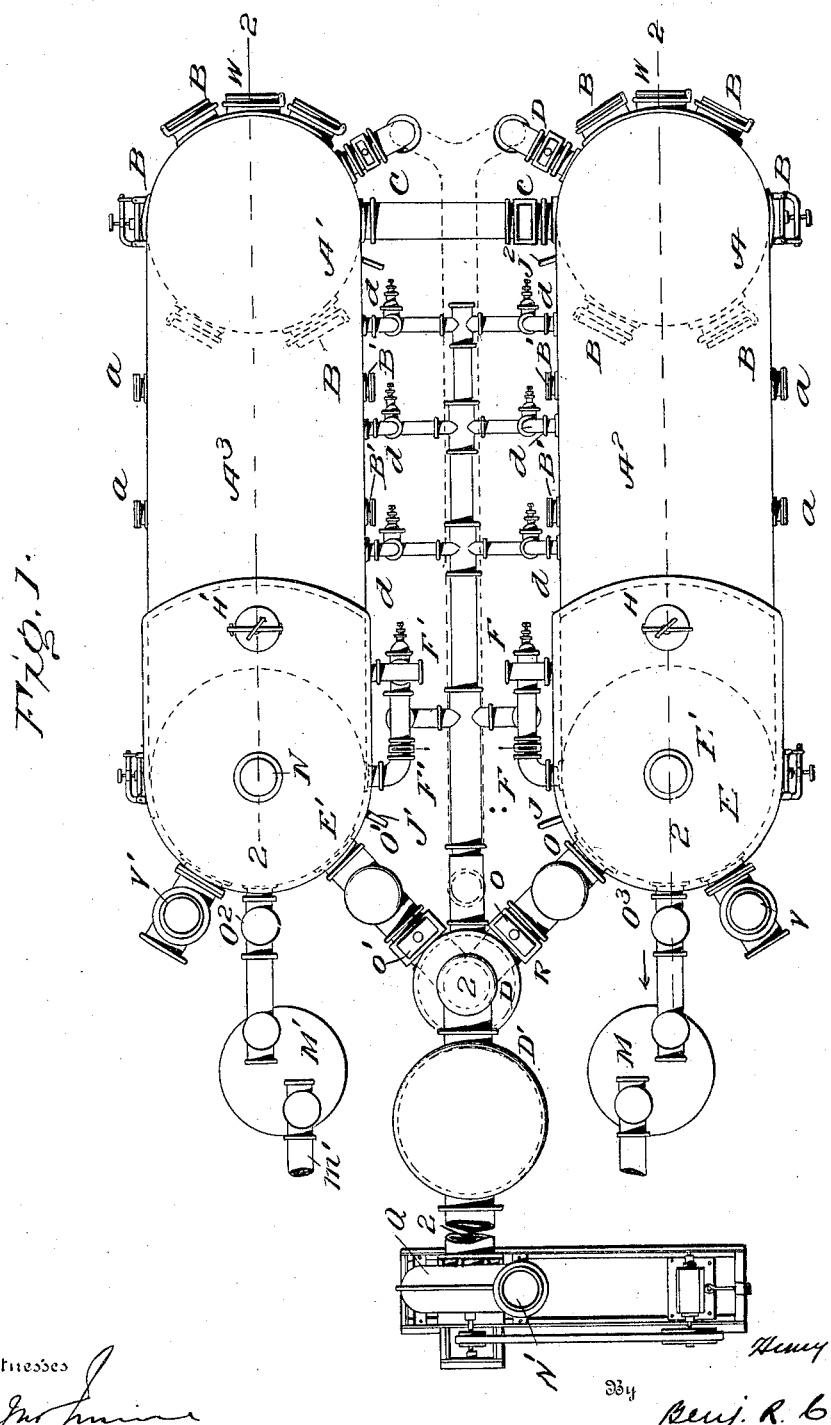
Witnesses
Inventor
Henry C. Rew
By
Benj. R. Catlin
Attorney

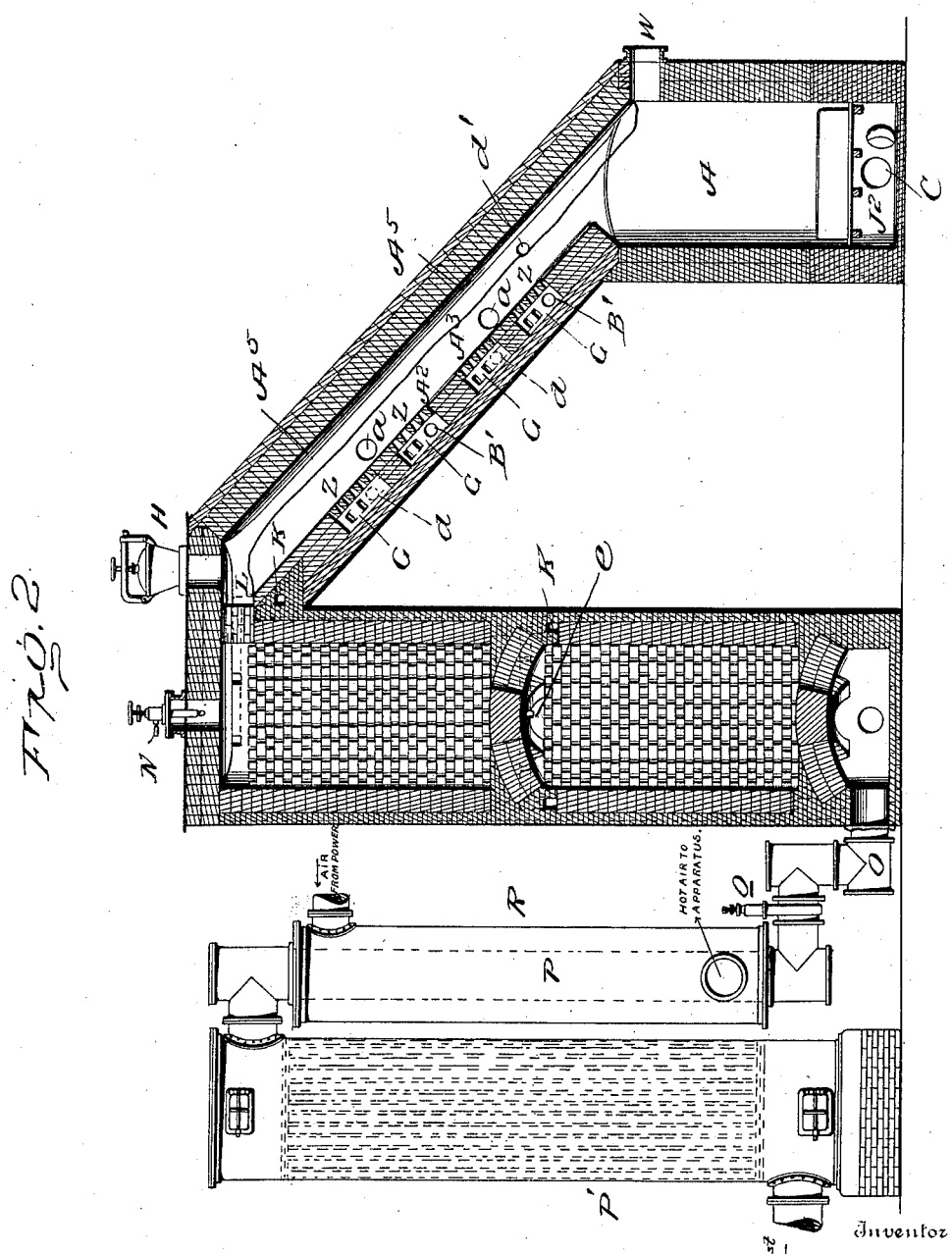

UNITED STATES PATENT OFFICE.

HENRY CUNNINGHAM REW, OF EVANSTON, ILLINOIS, ASSIGNOR TO NATIONAL GAS & WATER COMPANY, OF CHICAGO, ILLINOIS, A CORPORATION OF ILLINOIS.

APPARATUS FOR THE MANUFACTURE OF GAS.

SPECIFICATION forming part of Letters Patent No. 688,121, dated December 3, 1901.

Application filed March 20, 1901. Serial No. 52,061. (No model.)

*To all whom it may concern:*

Be it known that I, HENRY CUNNINGHAM REW, a resident of Evanston, in the county of Cook and State of Illinois, have invented certain new and useful Improvements in Apparatus for the Manufacture of Gas; and I do hereby declare the following to be a full, clear, and exact description of the invention, such as will enable others skilled in the art to which it pertains to make and use the same.

The invention relates to apparatus for the manufacture of gas, and has for its object to increase the efficiency and economy of such apparatus.

The invention consists in the construction herein described and pointed out.

In the accompanying drawings, Figure 1 is a plan of my improved apparatus. Fig. 2 is a part section on line 2 2 of Fig. 1.

The plan shows a complete apparatus from the inlets for air, steam, oil, and coal to the outlets for final burned products of combustion and carbureted water-gas. The vertical section, Fig. 2, shows only one side (of which the other is a duplicate) through the outlets for the burned products of combustion only.

The same letters designate like parts in both drawings herein.

The apparatus is built of boiler-iron shells lined with fire-brick and is provided with proper connections and openings, substantially as shown.

A A' designate fuel or combustion and water-gas-generating chambers and are called hereinafter "generators." The flue C, controlled by valve $c$, Fig. 1, connects them at the base below the grate-bars. They are provided at the bottom and top with suitable openings B and W, fitted with gas-tight doors. They have air-supply pipes $d$ and steam-supply pipes $J^2$ below the grate-bars.

$A^2$ $A^3$ designate internally-fired coking-chambers located above the generators and directly connected thereto. They are provided on the lower side with ash-pits G, Fig. 2, and below the perforated grates Z, Fig. 2, with separate air-supply pipes $d$ and with openings with gas-tight doors B' into said ash-pits. On the sides are openings with gas-tight doors $a$, and at the top is a charging-hopper H H', adapted to be made air and gas tight. The irregular line through the coking-chamber, Fig. 2, designates the line of coking material. Above this line, at the lower ends of the chambers, are air-supply pipes $d'$.

E E' designate regenerative chambers, hereinafter called "superheaters." They are filled with loosely-piled refractory material. Combustion-chambers $e$, Fig. 2, are provided having air-supply pipes F F', Fig. 1, connected to flues and ports K, Fig. 2. At the top of each of the superheaters suitable provision is made for an oil-injector N. The superheaters, coking-chambers, and generators are directly connected by flues (designated at L) and open spaces (designated at $A^5$, Fig. 2) above the line of coking material. At the base of the superheaters outlet-pipes O O', controlled by suitable valves $o$ $o'$, are provided for the escape of the final burned products of combustion, and these outlets are connected with an exhauster Q, having an outlet N', by the medium, if desired, of a water-heater P' and an air-heater P. Neither of these, however, is regarded as essential.

Outlets $O^2$ $O^3$, Fig. 1, controlled by suitable valves, (not shown,) are provided for the escape of the manufactured gas and are directly connected by pipes with the condensers, seals, or washers M M', Fig. 1. Outlets V V', Fig. 1, are also provided at the base of the superheaters as vents and are carried above the tops of the superheaters by stacks fitted with gas-tight lids, which are left open when the apparatus is not in use.

It will be understood that I do not limit myself to the precise arrangement and details of my improved apparatus as hereinbefore described with reference to the accompanying drawings, as the construction may be variously modified without departing from the nature of my invention. For instance, the apparatus may be constructed either in one structure with suitable dividing-walls or in two structures. Also the coking-chambers may be constructed in a vertical or horizontal position, combined with generators or combined with generators and superheaters, provided that separate air-supplies are furnished for each of the chambers and flues are provided directly connecting them.

Although the best results are obtained when the apparatus is used as a whole, still one-half the apparatus may be operated by closing the valve $c$ in flue C, Fig. 1, and a valve $o$ or $o'$ in outlet-pipe O or O' when it is necessary to repair either side or to restrict the production of gas.

The operation of the apparatus is preferably as follows: When starting up with cold apparatus, the chambers A, A', $A^2$, and $A^3$ are first filled with coke or hard coal through the tight feeding apparatus H H', and all openings are tightly closed; but after the apparatus is heated up all consumption of fuel in the operation of the apparatus is supplied by charging bituminous coal through the hoppers H H'. The fuel is ignited at the base of the generators A A'. Air is supplied from a blower through pipes D and also, if desired, above the fuel into the coking-chambers through pipes $d'$ and below the perforated grates in coking-chambers through pipes $d$ and at ports K in the superheaters E E' through air-supply pipes F F', Fig. 1. At the same time the exhauster Q is put in operation, valves $o$ $o'$ in outlet-pipes O O' and the outlet N' being open, so that by simultaneously blasting and exhausting the first heat is generated in the apparatus, and the pressure inside of the apparatus is kept at about the normal. The producer-gases from the generators and coking-chambers, meeting the air-supply in the superheaters, are completely burned in passing through the superheaters. This combustion rapidly ignites the coal the whole length of the fuel-chambers and heats up the brickwork in the superheaters, and the heat produced is partially absorbed in the loosely-piled refractory material. The final burned products of combustion are drawn out of the superheaters through the outlet-pipes O O', the air-heater P, and water-heater P' by the exhauster Q and driven out through the outlet N'. In passing through the air-heater P and water-heater P' the remaining waste heat of the products of combustion not absorbed by the loosely-piled fire-brick in the superheater is absorbed in heating the air for the air-blasts to the apparatus and in heating the water for the boilers. By means of this simultaneous blasting and exhausting the fuel in the generators A A' is raised to incandescence and is highly heated in the coking-chambers $A^2$ $A^3$, while the brickwork lining of the chambers has also become highly heated preparatory to charging bituminous coal into the coking-chambers. The refractory material in the superheaters E E' is also raised to the proper temperature to vaporize oil and cause it to combine with and carburet the hydrogen gas derived from the decomposition of steam. When the apparatus is seen by means of sight-holes to be properly heated for gas-making, the valves controlling all the air-supply pipes and the outlets O O' are closed, and if additional fuel is now required bituminous coal may be charged into the coking-chambers. The valve controlling gas-outlet pipe $O^2$ and valve $c$ in the pipe C between the base of the generators are opened, and steam is admitted at the base of the superheater E through steam-supply pipe J. The steam passes up through the superheater and through flue L into coking-chamber $A^2$, down through the coking-chamber, and through the incandescent fuel in generator A, where it is largely decomposed. The resulting water-gas and any undecomposed steam pass through flue C into the base of generator A and up through the incandescent fuel in chamber A'. The steam being thus first highly superheated and then passed through two beds of incandescent fuel is completely decomposed. The water-gas thus generated passes upward through the coking-chamber $A^3$ and through flue L into the superheater E', mixing with the volatile hydrocarbons distilled from the bituminous coal. Here, if desired, sufficient oil is admitted through N to carburet the gases to any desired illuminating power. In passing down through the highly-heated superheater E' the mixed coal, oil, and water-gas become thoroughly combined into a fixed illuminating-gas. The gas then passes out through pipe $O^2$ into the condenser or washer M' and from thence to the cleansing apparatus. When the temperature in the apparatus has been reduced to a point where it will no longer decompose the steam, vaporize the oil, and fix the gases, the steam is shut off, the gas-outlet $O^2$ is closed, and the product-outlets O O' opened and air is again admitted, as before, to the generators, coking-chambers, and superheaters through the supply-pipes provided therefor in order to reheat the apparatus previous to another run of gas.

It is thus seen that the operation of the apparatus consists in the alternate simultaneous heating up by the admitting of air and exhausting of the products of combustion and making of gas by admitting steam and oil. As the superheaters are provided alike with steam and oil inlets and gas-outlets, the direction of steam and gas through the apparatus may be reversed at will when making gas, according to the condition of the fires in the generators or the condition of the superheaters. For instance, after heating up the apparatus and closing the outlets for products and all air-inlets and opening gas-outlet at the base of superheater E steam may be admitted at the base of superheater E' through steam-pipe J', and the gases generated in passing the steam through the generators may be enriched and fixed in passing through superheater E and thence through the outlet-pipe to condenser or washer M.

According to the condition of the fires or to prevent the burning out of the grate-bars in the generators an uprun may be made through both generators by closing the valve $c$ in flue C and admitting steam at the base of the generators through pipes $J^2$, admitting oil to both superheaters, as at N, and opening the gas-outlets at the base of both superheaters, or either side may be operated alone in this manner when making gas.

The generators A A' are supplied with hot coke descending by gravity from the coking-chambers $A^2 A^3$ as fast as the fuel in the generators is consumed by the operation of the apparatus.

Fresh fuel (bituminous coal) is preferably charged at the beginning of the operation of gas-making through the hoppers H H' and in the presence of the highly-heated fuel and brickwork of the coking-chamber readily gives off its volatile hydrocarbons. These gases during the time of gas-making mix with the water-gas and partially enrich it, thereby reducing the amount of oil required to enrich it for illuminating purposes. The coal is quickly coked by the heat directly applied to it in its passage down through the coking-chambers and by the combustion induced by the air-blasts in the base of the coking-chambers.

Openings $a\ a$ are provided through which bars may be inserted for the purpose of breaking up the mass of coking coal and to move it down into the generator, if necessary. Openings B B are provided for the removal of any accumulation of ashes formed by the combustion at these points.

In order to more thoroughly and quickly coke slow-coking coals, a separate air-supply pipe $d'$ is provided in each coking-chamber above the line of the coking coal, through which air may be admitted while heating up the apparatus. This causes combustion of a portion of the primary products generated, and the resulting flames pass over the surface of the coking coal, whereby the heat in the coking-chambers is increased and the brick lining highly heated. It is understood that any number of air-supply pipes may be supplied both below and above the coking coal in order to fully carry out the purposes of my invention.

Great advantages are gained by locating the coking-chamber between the generators and superheaters, as the coal is fully exposed to the heat in both the generators and superheaters, and the radiation of the heat and the free circulation of the highly-heated gases aids in the coking operation. It is seen that the combustion going on in the lower parts of the coking-chambers is not chilled or extinguished by the passing of steam through the apparatus, as the steam is not passed through the incandescent coke produced in the coking-chambers. Furthermore, the primary products of combustion passing from the generators while heating up do not interfere with nor extinguish the combustion going on in the coking-chambers, as the products from both the generators and coking-chambers pass into and through the space left in the coking-chambers above the coking coal. It is found that when the coking-chambers are constructed in a vertical position the products generated in the lower chambers prevent and partially extinguish combustion caused by the inlet of air higher up in the chambers. The inclined position of the coking-chambers thus provides a proper outlet for the products when any number of air-inlets are in use either below or above the fuel, or both. The coke falls by gravity from the coking-chambers into the generators. By this method coke is not only quickly manufactured by direct heat without the use of retorts, but it is then immediately transferred while in a highly-heated condition to a water-gas-generating chamber automatically and without loss of time, gas, labor, or heat.

By the use of an exhauster it is provided that the apparatus may be supplied with fresh fuel and ashes drawn from the generators without loss of time, gas, or heat, the apparatus being steadily heated up while these operations are going on. At such times the air-blasts are wholly or partially shut off and air is drawn into the apparatus through the openings provided to admit fuel and to draw out the ashes, so that soon after these operations the apparatus is again ready for a run of gas. It is understood that the manufactured water-gas may be exhausted either through the exhauster shown on the plan and passed into a holder through a proper supply-pipe or that a separate exhauster may be provided for water-gas, if desired. It is not essential, however, in every case that an exhauster be used.

Any suitable means for forcing air into the apparatus or for exhausting the gas or for charging fuel may be employed, and the number and form of various parts and of minor parts of the construction may be varied, provided the substantial principles of construction and operation are not changed.

Having thus described my invention, what I claim as new, and desire to secure by Letters Patent, is—

1. The combination of a water-gas generator, having an air-inlet, a steam-inlet, and an ash-outlet at the base thereof, an inclined coking-chamber directly connected thereto, having a separate air-inlet at the lower side thereof, and an inlet for fuel at the top whereby coal may be charged from time to time, in combination with a superheater, the said coking-chamber being located between the said gas-generator and said superheater and in open and immediate communication with both, whereby fuel in the generator and the coking-chamber may be simultaneously heated by admitting air to each, and whereby the products of combustion from the generator may be passed through the coking-chamber and mingled with products of combustion produced in said chamber and the mingled products passed into the superheater and finally burned therein by a separate air-supply and the final burned products of combustion passed through the superheater, while heating up the apparatus previous to making gas, substantially as described.

2. The combination of a water-gas generator, having an air-inlet, a steam-inlet, and an ash-outlet at the base thereof, an inclined coking-chamber directly connected thereto, having a separate air-inlet at the lower side thereof, and having also an air-inlet in its upper part above the fuel-line, and an inlet for fuel at the top whereby coal may be charged from time to time, in combination with a superheater, the said coking-chamber being located between the said gas-generator and said superheater and in open and immediate communication with both, whereby fuel in the generator and the coking-chamber may be simultaneously heated by admitting air to each, and whereby the products of combustion from the generator may be passed through the coking-chamber and mingled with products of combustion produced in said chamber and the mingled products passed into the superheater and finally burned therein by a separate air-supply and the final burned products of combustion passed through the superheater while heating up the apparatus previous to making gas, substantially as described.

3. The combination of a water-gas generator, having an air-inlet, a steam-inlet, and an ash-outlet at the base thereof, an inclined coking-chamber directly connected thereto, having separate air and steam inlets at the lower side thereof, and an inlet for fuel at the top whereby coal may be charged from time to time, in combination with a superheater, the said coking-chamber being located between the said gas-generator and said superheater and in open and immediate communication with both, whereby fuel in the generator and the coking-chamber may be simultaneously heated by admitting air to each, and whereby gas from the generator may be passed in direct contact with the coal in the coking-chamber and mingled with vapors and gases therefrom and then passed directly into the superheater, substantially as described.

In testimony whereof I have signed this specification in the presence of two subscribing witnesses.

HENRY CUNNINGHAM REW.

Witnesses:
EVA L. PFEIFFER,
E. P. REW.